:::

United States Patent
Bohacik et al.

(10) Patent No.: US 11,176,386 B2
(45) Date of Patent: Nov. 16, 2021

(54) SYSTEM AND METHOD FOR CONTINUOUS OPERATION OF VISION/RADAR SYSTEMS IN PRESENCE OF BIT ERRORS

(71) Applicant: NXP USA, Inc., Austin, TX (US)

(72) Inventors: Pavel Bohacik, Rožnov pod Radhoštěm (CZ); Shreya Singh, Ranchi (IN); Nishant Jain, Nodia (IN); Anshul Goel, Ghaziabad (IN); Shivali Jain, Narwana (IN); Naveen Kumar Jain, Panipat (IN)

(73) Assignee: NXP USA, Inc., Austin, TX (US)

( * ) Notice: Subject to any disclaimer, the term of this patent is extended or adjusted under 35 U.S.C. 154(b) by 84 days.

(21) Appl. No.: 16/505,522

(22) Filed: Jul. 8, 2019

(65) Prior Publication Data
US 2021/0012118 A1    Jan. 14, 2021

(51) Int. Cl.
  *G06K 9/00* (2006.01)
  *G06T 1/00* (2006.01)
  *H04L 1/00* (2006.01)

(52) U.S. Cl.
  CPC ..... *G06K 9/00798* (2013.01); *G06K 9/00671* (2013.01); *G06T 1/00* (2013.01); *H04L 1/00* (2013.01)

(58) Field of Classification Search
  None
  See application file for complete search history.

(56) References Cited

U.S. PATENT DOCUMENTS

| 5,878,041 | A | 3/1999 | Yamanaka et al. | |
|---|---|---|---|---|
| 8,218,052 | B2 * | 7/2012 | Upton | H04N 5/361 |
| | | | | 348/312 |
| 8,553,721 | B2 | 10/2013 | Heise | |
| 2006/0204038 | A1 * | 9/2006 | Yokota | H04N 13/239 |
| | | | | 382/104 |
| 2010/0322366 | A1 * | 12/2010 | Kim | H04L 7/042 |
| | | | | 375/362 |

(Continued)

OTHER PUBLICATIONS

K. Lim, G. S. Kim, S. Kim and K. Baek, "A multi-lane MIPI CSI receiver for mobile camera applications," in IEEE Transactions on Consumer Electronics, vol. 56, No. 3, pp. 1185-1190 (Year: 2010).*

(Continued)

*Primary Examiner* — Stefan Gadomski (57) ABSTRACT

A radar and/or camera system may include a receiver subsystem that receives image and/or radar data from one or more imaging/radar subsystems via multiple data lanes. A vision processor of the system may receive a data stream that includes the image and/or radar data and one or more synchronization signals including a vertical sync signal. The receiver subsystem may include a timing event generator that toggles the vertical sync signal in response to detecting certain timing event errors in order to correct these timing event errors without interrupting normal operation of the system. The receiver subsystem may include sync monitoring circuitry that may detect synchronization errors that occur when synchronization signal pulses received by the receiver subsystem do not match a predefined synchronization pattern within a scan window of predefined length. The system may be reset in response to detection of such synchronization errors.

14 Claims, 9 Drawing Sheets

(56) References Cited

U.S. PATENT DOCUMENTS

| | | | |
|---|---|---|---|
| 2011/0078545 A1* | 3/2011 | He | H03M 13/333 |
| | | | 714/775 |
| 2012/0162460 A1* | 6/2012 | Gray | G06T 7/246 |
| | | | 348/222.1 |
| 2012/0162511 A1* | 6/2012 | Hewes | H04N 13/243 |
| | | | 348/510 |
| 2013/0187934 A1* | 7/2013 | Kim | G09G 3/2003 |
| | | | 345/501 |
| 2013/0314360 A1* | 11/2013 | Saitoh | G06F 3/04184 |
| | | | 345/173 |
| 2014/0136741 A1* | 5/2014 | Tu | H04L 69/40 |
| | | | 710/110 |
| 2014/0333608 A1* | 11/2014 | Okairi | G09G 3/3648 |
| | | | 345/214 |
| 2014/0368490 A1* | 12/2014 | Yokonuma | G06F 1/325 |
| | | | 345/212 |
| 2015/0009288 A1 | 1/2015 | Wu et al. | |
| 2015/0130822 A1 | 5/2015 | Lee et al. | |
| 2015/0221261 A1* | 8/2015 | Asai | G09G 5/001 |
| | | | 345/534 |
| 2015/0235342 A1* | 8/2015 | Asai | G09G 3/20 |
| | | | 345/531 |
| 2015/0235343 A1* | 8/2015 | Asai | G09G 5/18 |
| | | | 345/534 |
| 2015/0325212 A1* | 11/2015 | Gomez | G09G 3/3208 |
| | | | 345/213 |
| 2016/0027146 A1* | 1/2016 | Kim | G09G 3/3611 |
| | | | 345/629 |
| 2016/0078851 A1* | 3/2016 | Asai | G09G 5/18 |
| | | | 345/555 |
| 2016/0212456 A1* | 7/2016 | Bohm | H04N 7/18 |
| 2016/0227160 A1* | 8/2016 | Baek | G06F 13/4265 |
| 2017/0123472 A1* | 5/2017 | Kodavalla | G06F 13/4273 |
| 2017/0208219 A1* | 7/2017 | Lee | G09G 5/008 |
| 2018/0054550 A1* | 2/2018 | Kuroiwa | H04N 5/073 |
| 2018/0277034 A1* | 9/2018 | Kim | G09G 3/3225 |
| 2019/0045088 A1* | 2/2019 | Ansari | H04N 5/04 |
| 2019/0057051 A1* | 2/2019 | Herrmann | G06F 3/005 |
| 2020/0003862 A1* | 1/2020 | Doare | G06F 1/10 |
| 2020/0007310 A1* | 1/2020 | Pavao Moreira | H04L 27/0008 |

OTHER PUBLICATIONS

MIPI, "Draft MIPI Alliance Specification for Camera Serial Interface 2 (CSI-2)", Apr. 2, 2009, pp. 1-170, Draft Version 1.01.00 Revision 0.04, MIPI Alliance, Inc., USA.

NXP Semiconductors, "MIPI-CSI2 Peripheral on i.MX6 MPUs", Jul. 1, 2016, pp. 1-32, Document No. AN5305, Rev. 0, retrieved from the internet at http://cache.nxp.com/files/32bit/doc/app_note/AN5305.pdf on Oct. 27, 2016.

* cited by examiner

SYSTEM AND METHOD FOR CONTINUOUS OPERATION OF VISION/RADAR SYSTEMS IN PRESENCE OF BIT ERRORS

TECHNICAL FIELD

Embodiments of the subject matter described herein relate generally to a video device that processes video data and a method for embedded data capture on a virtual channel. The invention is applicable to, but not limited to, a video device for embedded data capture in a single buffer on a MIPI Alliance CSI-2 video data link.

BACKGROUND

The Mobile Industry Processor Interface (MIPI) Alliance is a global, open-membership organization that develops interface specifications for the mobile ecosystem, including mobile-influenced industries. The MIPI Alliance co-ordinate technologies across the mobile computing industry, and the Alliance's focus is to develop specifications that ensure a stable, yet flexible technology ecosystem.

The Camera Serial Interface (CSI) is a specification of the MIPI Alliance. It defines an interface between a camera and a host processor. Vehicle-based applications that include a CSI include front camera advanced driver assistance systems (ADAS), whereby video data is processed to detect pedestrians, objects, issue lane departure warnings, smart head-beam control and traffic sign recognition. The MIPI CSI-2 standard allows concurrent video data reception from up to four virtual channels (VCs). A virtual channel represents a source (which in some instances may be a combination of multiple MIPI sensors), with data transferred on a virtual channel relating to video data from the one (or more) source(s). In the MIPI CSI-2 standard, VCs signify different video data sources. A combination of video sources may also represent one VC. The VCs use a single packet per high-speed (HS) frame, which includes a frame start/frame end, an optional line start/line end and a low power (LP) state between frames.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the Subject Matter Described Herein Relate to

Figure 1:
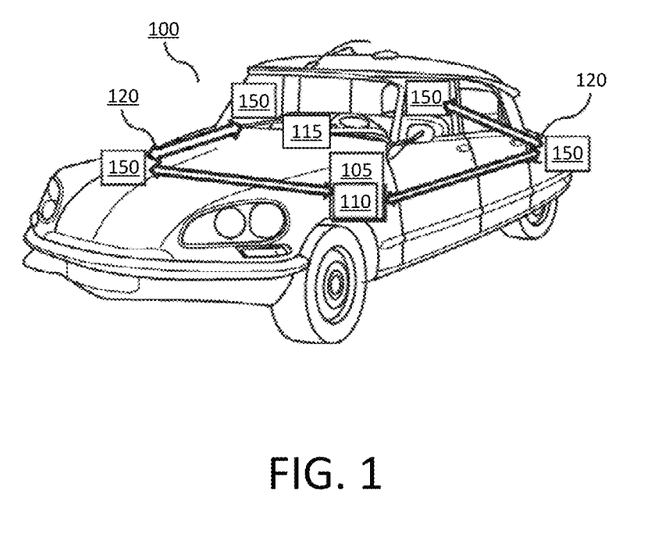
FIG. 1 is a simplified diagram of a vehicle employing a camera system that supports the MIPI CSI-2 standard, according to example embodiments.

Referring now to FIG. 1, a simplified diagram of a vehicle 100 employing a camera/radar system 105 (e.g., corresponding to a camera system and/or a radar system) that includes a vision/radar processor 110 is illustrated, according to example embodiments of the invention. In this example, the vision/radar processor 110 is communicatively coupled to the plurality of imaging/radar subsystems 150 attached to the vehicle via a communication network 120, which may be an integrated communication bus network, for example. The imaging/radar subsystems 150 may each include a respective camera device configured to capture visual image data or a radar device configured to capture radar data. Image and/or radar data captured by the imaging/radar subsystems 150 may be sent to the camera/radar system 105 via the communication network 120, for example, using a serial interface standard such as the MIPI CSI-2 standard.

A display unit 115 may be included in the vehicle 100, which may communicate with the vision/radar processor 110. For example, the display unit 115 may receive video data from vision/radar processor 110 and may display a corresponding video stream, which may be extracted by the vision/radar processor 110 from MIPI CSI-2 formatted video data generated by the imaging/radar subsystems 150 and sent to the camera/radar system 105. For example, the display unit 115 may be configured to display one or more warnings in response to nearby obstacles detected via the camera/radar system 105 and the imaging/radar subsystems 150. As another example, the display unit 115 may be configured to display one or more warnings in response to detecting (e.g., via the camera/radar system 105 and the imaging/radar subsystems 150) that the driver is exhibiting behaviors indicative of sleep or drowsiness. Speakers included in or coupled to the display unit 115 may be configured to output one or more audible warnings when associated warnings are displayed via the display unit 115.

Although examples of the invention are described with reference to a vehicle 100 such as a car, as illustrated in FIG. 1 it is envisaged that any road transport device may use the concepts herein described, such as trucks, motorcycles, buses, etc.

Figure 2:
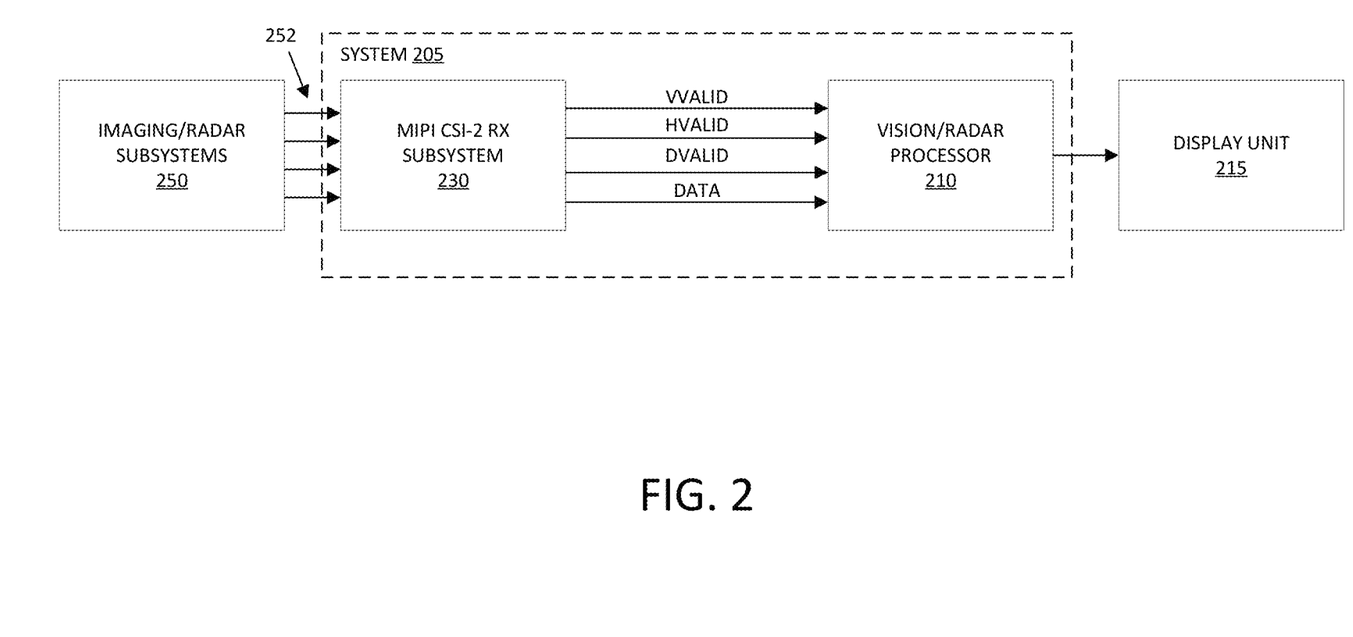
FIG. 2 is a simplified block diagram of a camera/radar system that supports the MIPI CSI-2 standard, in accordance with example embodiments.

FIG. 2 shows a block diagram depicting how image/radar data generated at imaging/radar subsystems 250 (e.g., imaging/radar subsystems 150 of FIG. 1) may be received and processed by a camera/radar system 205 (e.g., camera/radar subsystem 105 of FIG. 1) that includes a MIPI CSI-2 receiver subsystem 230 and a vision/radar processor 210 (e.g., vision/radar processor 110 of FIG. 1) to produce formatted video data that is output to and shown on a display unit 215 (e.g., display unit 115 of FIG. 1).

As shown, the imaging/radar subsystems 250 may send collected image/radar data according to the MIPI CSI-2 protocol to the MIPI CSI-2 RX subsystem 230 via a number of data lanes 252 (four data lanes, in the present example). As will be described, the image/radar data collected from the data lanes 252 may be collected (e.g., in buffers) and packetized by the MIPI CSI-2 receiver subsystem 230. The format of the packets into which the image/radar data may be organized by the MIPI CSI-2 receiver subsystem 230 may vary depending on the interface used. The MIPI CSI-2 receiver subsystem 230 may send the data packets, along with a data valid signal DVALID, a horizontal sync signal HVALID, and a vertical sync signal VVALID to the vision/radar processor 210. The vision/radar processor 210 may organize the image/radar data into frames of image/radar data (i.e., image/radar data frames), according to the VVALID, HVALID, and DVALID signals, as will be explained. The vision/radar processor 210 may then process the image/radar data frames and store the resultant processed data in a system memory of the camera/radar system 205. For example, the processed data may subsequently be used to generate warnings that may be generated and displayed and/or made audible via the display unit 215. In some embodiments, feature extraction and/or statistical modelling may be applied to the image/radar data frames by the vision/radar processor 210 or one or more other processors of the camera/radar system 205 to produce the processed data. For example, the processed data may include obstacles, road signals, and signs identified from image data frames received by the vision/radar processor 210. For example, the processed data may include objects detected in close proximity to the vehicle based on radar data received by the vision/radar processor 210, and may further include the side of the vehicle to which the detected object is in close proximity. For example, the processed data may include an indication that one or more pedestrians are proximal or in the path of the vehicle based on feature extraction performed on image data frames received by the vision/radar processor 210.

Figure 3:
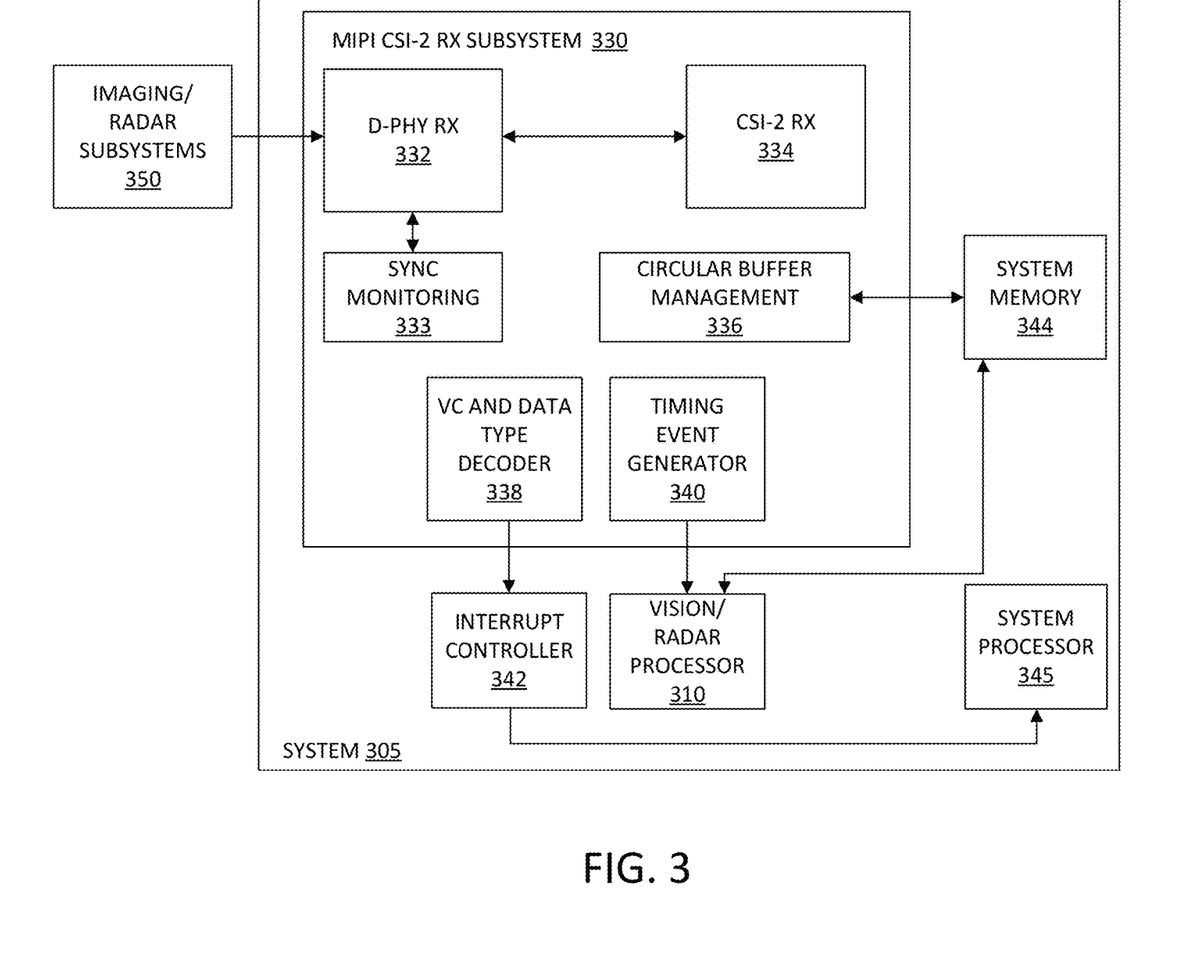
FIG. 3 is a simplified block diagram of a camera/radar system that supports the MIPI CSI-2 standard depicting additional details of a MIPI CSI-2 receiver subsystem, in accordance with example embodiments.

FIG. 3 shows a more detailed block diagram of components that may be included in a camera/radar system 305 (e.g., camera/radar system 105, 205, FIGS. 1, 2). As shown, the camera radar system 305 may include a MIPI CSI-2 receiver subsystem 330 (e.g., MIPI CSI-2 receiver subsystem 230, FIG. 2), a system memory 344, an interrupt controller 342, and a vision/radar processor 310 (e.g., vision/radar processor 110, 210, FIGS. 1, 2). The MIPI CSI-2 receiver subsystem 330 may include a display serial interface (DSI) physical layer (D-PHY) receiver 332, sync monitoring circuitry 333, a CSI-2 receiver 334, circular buffer management circuitry 336, a VC and data type decoder 338, and a timing event generator 340.

The D-PHY receiver 332 may receive image and/or radar data from the imaging/radar subsystems 350. For example, the D-PHY receiver 332 may receive the image/radar data via four separate data lanes that coupled the D-PHY receiver 332 to the imaging/radar subsystems 350. The CSI-2 receiver 344 may receive the data lanes of the D-PHY receiver 332. The CSI-2 receiver may include lane merging circuitry that effectively organizes the image/radar data received from the imaging/radar subsystems 350 via the D-PHY receiver 332 into packets. For example, after being organized into packets, the image/radar data can be organized into individual rows and/or frames to form images which may be combined to form a video data stream from the image/radar data.

In order to verify that incoming data received on the data lanes is valid, the CSI-2 receiver 334 may wait until it has received a synchronization pattern (i.e., "sync pattern") of signal pulses on synchronization inputs corresponding to, but separate from, each of the data lanes before proceeding to merge the image/radar data. In order to be considered valid, the signal pulses of the sync pattern may be required to fall within a scan window of predetermined size. In other words, each signal pulse of the sync pattern may be required to occur within a predetermined time period following reception of the first signal pulse of the sync pattern. However, in some circumstances (e.g., due to latency variations or failure of one or more of the imaging/radar subsystems 350), signal pulses associated with the sync pattern may be delayed or may fail, such that one or more of the signal pulses of the sync pattern are received outside of the scan window or are not received at all, resulting in the sync pattern not being considered valid by the CSI-2 receiver 334. If multiple consecutive invalid sync patterns are received by the CSI-2 receiver 334, data lane buffers interposed in the data lanes of the CSI-receiver 334 may overflow as image/radar data continues to be output by the imaging/radar subsystems 350. Such overflows may cause loss of image/radar data, resulting in incomplete or missing image/radar data frames. In order to correct such synchronization errors quickly, the sync monitoring circuitry 333 may monitor the synchronization inputs (e.g., by snooping associated Parallel Peripheral Interface (PPI) interface signals to identify sync pulses on the synchronization inputs). When a synchronization error occurs, the sync monitoring circuitry 333 may cause the interrupt controller 342 to output an interrupt, indicating to a system processor 345 of the system 305 that a synchronization error has occurred. The system processor 345 may then take appropriate action in response to the interrupt received from the interrupt controller 342 (e.g., resetting a link between the system 305 and the imaging/radar systems 350, resetting the system 305 itself, or carrying out other safety measures as may be required).

The circular buffer management circuitry 336 may manage pointers and/or other elements in the system memory 344. For example, the circular buffer management circuitry 336 may manage pointers stored in circular buffers in the system memory 344 on a per-buffer basis, where each circular buffer in the system memory 344 may store a particular data type of a given virtual channel (VC).

The VC and data type decoder 338 may process image/radar data received from the imaging/radar subsystems 350 to identify the VC and data type of the received image/radar data. The VC and data type decoder 338 may be coupled to the interrupt controller 342. For example, VC and data type decoder may identify the data type of the data received on each data lane/VC received from the imaging/radar subsystems, and may cause interrupts to be sent to the system processor 345 via the interrupt controller when certain predefined conditions (e.g., synchronization errors, timing event errors, etc.) are identified (e.g., by the sync monitoring circuitry 33 and/or the timing event generator 340).

The event timing generator 340 may generate and insert timing events into a data stream that includes the image/radar data received from the imaging/radar subsystems 350 (e.g., to create a modified data stream), and may send the modified data stream to the vision/radar processor 310. These timing events may include frame start boundaries, frame end boundaries, and line done boundaries, for example. Generally, a timing event may be a trigger that is sent to the vision/radar processor 310 by the timing event generator 340 to indicate that image/radar data stored on the system memory 344 is ready for processing by the vision/radar processor 310. A frame start boundary may indicate the start of transmission of a new image frame, while the frame end boundary may indicate the end of transmission of a preceding image frame, such that data packets received between a given frame start boundary and frame end boundary pair are interpreted by the vision/radar processor 310 as corresponding to a single image frame. A line done boundary may be inserted at the end of each line or at the end of a predetermined number of lines of image/radar data, and may be interpreted by the vision/radar processor as an indication that data received between two line done boundaries corresponds to a line of the image/radar data or to a predetermined number of lines of the image/radar data, depending on the embodiment.

Certain errors (e.g., 2-bit error correction code (ECC) errors) may occasionally cause one or more of these timing events to be corrupted. Examples of corrupted timing events may include a frame end boundary being changed to a frame start boundary, a frame start boundary being changed to a frame end boundary, a frame start boundary being lost or "dropped," and a frame end boundary being lost or "dropped."

When a timing event is corrupted, the camera/radar system 305 may enter an unpredictable state if automatic recovering of timing events is not enabled. In such cases, the camera/radar system 305 may be required to reset, potentially impacting automotive safety for embodiments where the camera/radar system 305 is part of an automotive safety system or an autonomous (e.g., self-driving) vehicle. Thus, it may be beneficial to perform automatic recovery of lost or otherwise corrupted timing events, as will be described.

Figure 4:
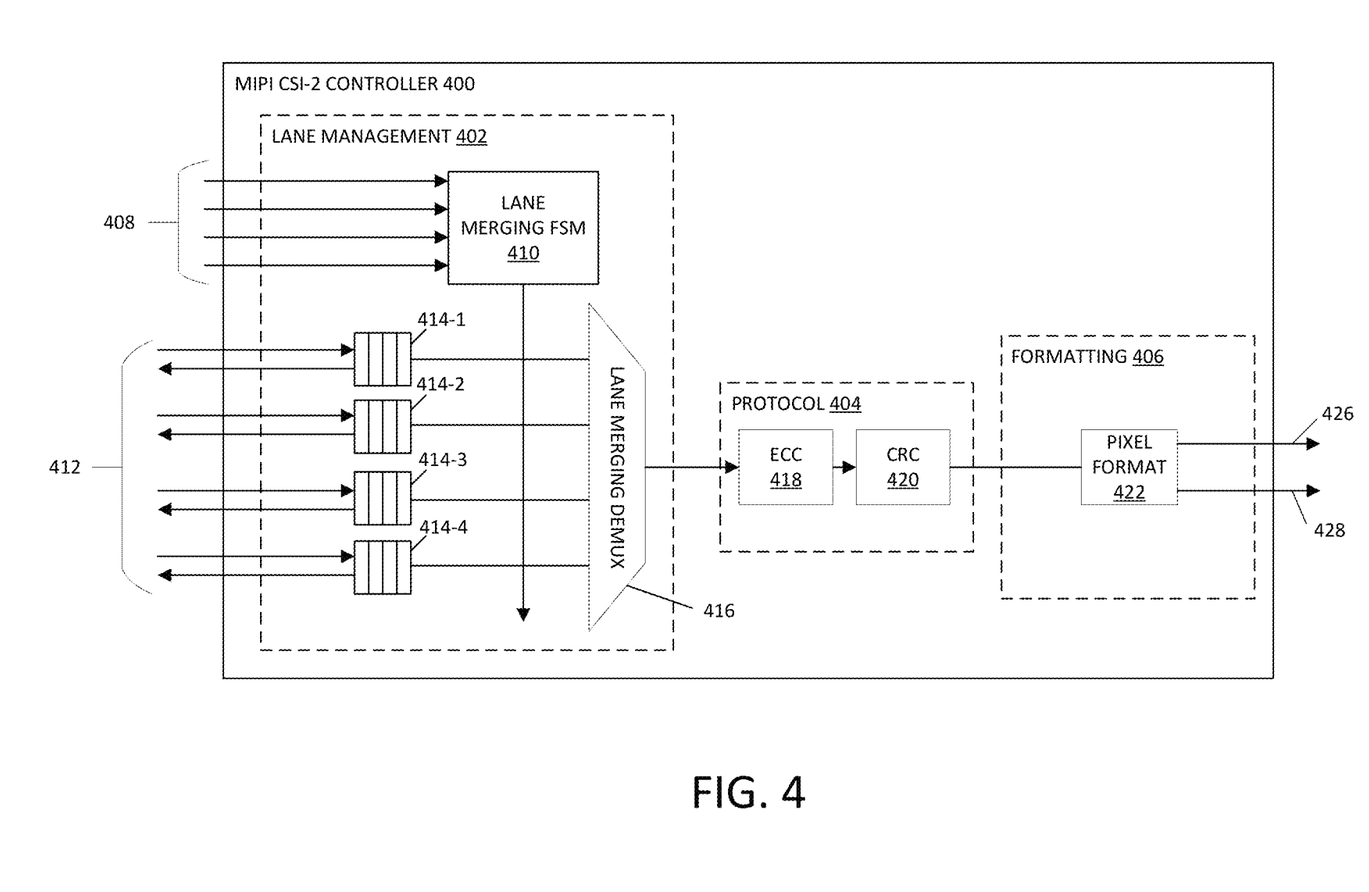
FIG. 4 is a simplified block diagram of a receiver controller that supports the MIPI CSI-2 system, in accordance with example embodiments.

FIG. 4 shows an illustrative block diagram of a MIPI CSI-2 controller 400 (e.g., which may correspond to the CSI-2 receiver 334 of FIG. 3). The controller 400 may include lane management circuitry 402, protocol circuitry 404, and formatting circuitry 406. The lane management circuitry 402 may include a lane merging finite state machine (FSM) 410, buffers 414, and a lane merging demultiplexer 416. The protocol circuitry 404 may include error correction code (ECC) circuitry 418, and cyclical redundancy check (CRC) circuitry 420.

Image/radar data may be received by the MIPI CSI-2 controller 400 (e.g., from one or more imaging/radar subsystems such as imaging/radar subsystems 150, 250, 350, FIGS. 1, 2, 3) via the data lanes 412. The buffers 414 may be coupled to the data lanes 412, such that image/radar data received via the data lanes 412 is temporarily stored in one or more the buffers 414. The lane merging FSM 410 may receive multiple lane synchronization inputs 408. Signal pulses received via the lane synchronization inputs 408 may correspond to a sync pattern, as described above, such that when signal pulses corresponding to the sync pattern are received by the lane merging FSM 410 within a scan window of predetermined length, the lane merging FSM 410 may control the lane merging demultiplexer 416 to begin packetizing the data stored in the buffers 414. The resultant data packets are passed to the ECC circuitry 418, then to the CRC circuitry 420, then to the pixel formatting circuitry 422, then to the formatting circuitry 406, and is finally output as an output data stream 426 and as a status/control data stream 428. The ECC circuitry 418 may identify and correct erroneous bits of the data packets based on ECC bits included in the data packets. The CRC circuitry 420 may analyze the data packets to identify line transmission errors based on CRC bits included in the data packets.

The formatting circuitry 406 may include a pixel formatting block 422 that receives the lane merged image/radar data stream and aligns it to correctly form meaningful pixel data, as defined by packet header derived information (e.g., defining the data type of the currently received image/radar data) of the image/radar data packets of the lane merged image/radar data stream.

Figure 5:
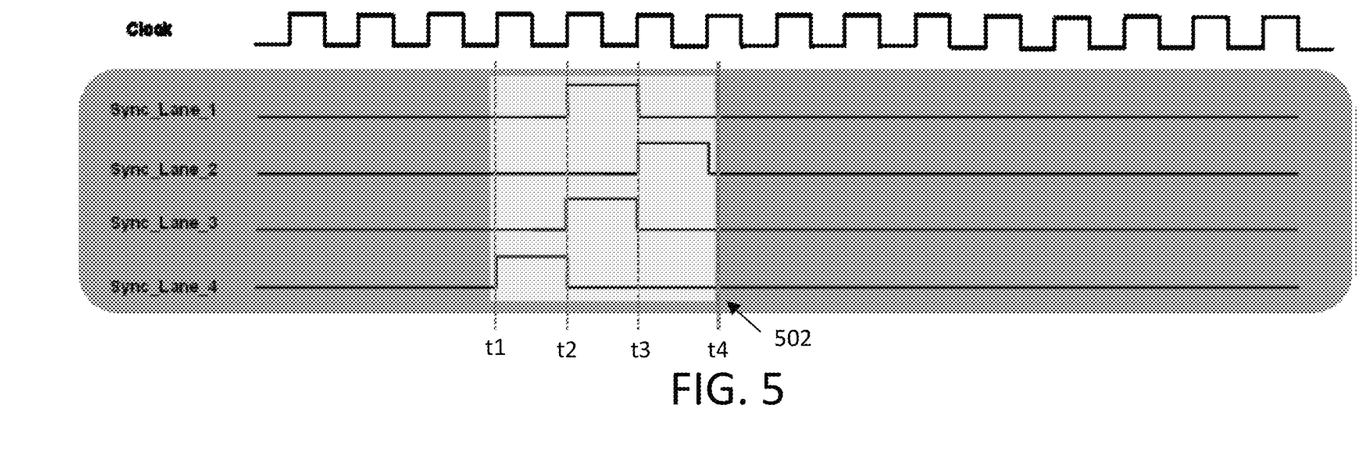
FIG. 5 is a timing diagram depicting a sync pattern corresponding to a data lane synchronization operation, in which each bit of the sync pattern is received within a predefined sync window, according to example embodiments.

FIG. 5 shows an example of a timing diagram illustrating a valid synchronization pattern, which may correspond to lane synchronization signal pulses received via the synchronization inputs 408 by the lane merging FSM 410 of FIG. 4. In the present example, the Sync_Lane_1, Sync_Lane_2, Sync_Lane_3, and Sync_Lane_4 signals are pulsed in a predetermined pattern prior to the transmission of data (e.g., to signal that data transmission is about to begin). As shown, at time t1, the signal Sync_Lane_4 is pulsed, at time t2, the signals Sync_Lane_1 and Sync_Lane_3 are pulsed, and at time t3, the signal Sync_Lane_2 is pulsed. As this complete pattern of pulses falls within a predefined scan window 502, defined as beginning at time t1 and ending at time t4, the lane merging FSM will interpret the pattern correctly as corresponding to the start of a "normal" reception operation (e.g., corresponding to reception of data from data lanes 412 by buffers 414 of FIG. 4).

Figure 6:
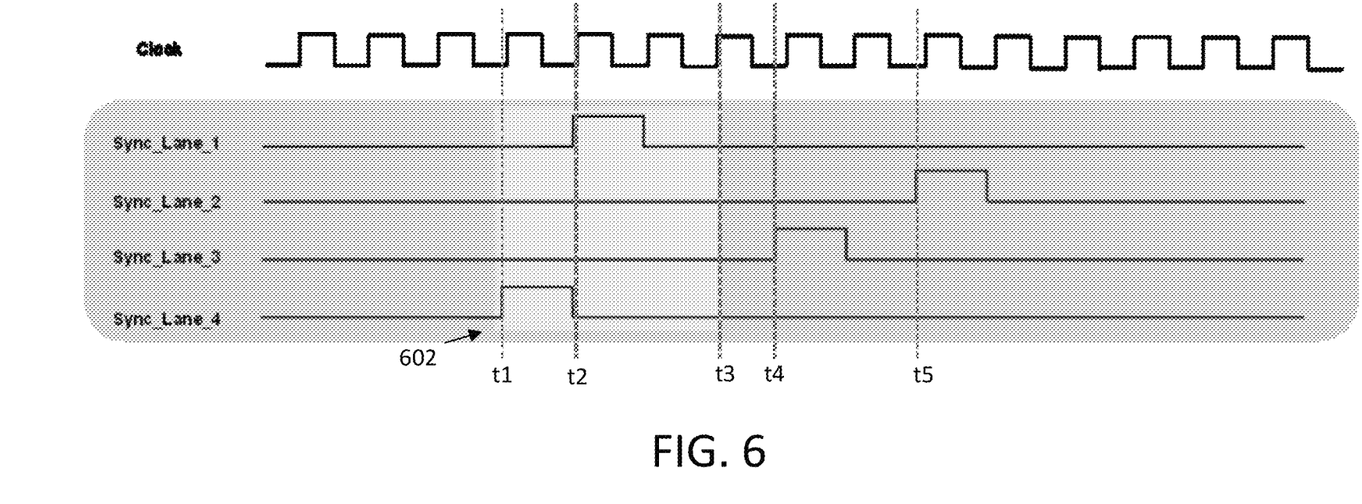
FIG. 6 is a timing diagram depicting a sync pattern corresponding to a data lane synchronization operation, in which some bits of the sync pattern are received outside of a predefined sync window, in accordance with example embodiments.

In contrast, FIG. 6 shows an example of a timing diagram illustrating an invalid synchronization pattern (e.g., identifiable as a synchronization or "sync" alignment error) which may correspond to lane synchronization signal pulses received via the synchronization inputs 408 by the lane merging FSM 410 of FIG. 4. In the present example, the Sync_Lane_1, Sync_Lane_2, Sync_Lane_3, and Sync_Lane_4 signals are pulsed in a predetermined pattern prior to the transmission of data (e.g., to signal that data transmission is about to begin). However, some of the signals in the pattern are delayed, such that two of the signals fall outside of a predefined scan window 602 (defined in this example as spanning times t1 to t3). As shown, at time t1, the signal Sync_Lane_4 is pulsed within the scan window 602, at time t2, the signal Sync_Lane_1 is pulsed within the scan window 602, at time t3 the scan window ends, at time t4, the Sync_Lane_3 signal is pulsed outside of the scan window, and at time t5, the signal Sync_Lane_2 is pulsed outside of the scan window. As the final two signals of the pattern fall outside of the predefined scan window 602, the lane merging FSM will interpret the pattern correctly as corresponding to the start of a "normal" reception operation (e.g., corresponding to reception of data from data lanes 412 by buffers 414 of FIG. 4). Conventionally, there is no method for the receiving controller to pause or slow down data reception in the event of such a sync alignment error, nor do conventional systems detect sync alignment errors. When a sync alignment error occurs and is neither detected nor corrected, data lane buffers (e.g., buffers 414 of FIG. 4) will eventually begin to overflow and data may be lost as a result. However, embodiments of the present system provide processes by which sync alignment errors such as this may be identified, and a corresponding error flag may be asserted, generating an interrupt to notify a system processor (e.g., the vision/radar processor 110, 210, 310, FIGS. 1, 2, 3) of the sync alignment error.

For example, sync monitoring circuitry (e.g., sync monitoring circuitry 333 of FIG. 3) may be included in a MIPI CSI-2 receiver subsystem (e.g., MIPI CSI-2 receiver subsystem 330 of FIG. 3), which may monitor pulses occurring at each of the synchronization inputs (e.g., monitoring each of the Sync_Lane_1, Sync_Lane_2, Sync_Lane_3, and Sync_Lane_4 signals). If the monitored pulses occur in the predefined pattern within the scan window 602, then no sync alignment error flag is asserted. However, if the monitored pulses of the predefined pattern occur outside of the scan window or if the monitored pulses correspond to a pattern other than the predefined pattern, then the sync monitoring circuitry asserts the sync alignment error flag to notify the system processor (e.g., system processor 345 of FIG. 3) via an interrupt that the sync alignment error has occurred. For example, the system processor may cause the system to reset in response to the sync alignment error. If the sync alignment error persists following one or multiple resets, this may be indicative of a permanent fault of the external imaging/radar subsystem sensor or the link (e.g., data lane or lanes) between the system and the external imaging/radar subsystem. In some embodiments, in response to detecting such a permanent fault the system processor may disable the link to the faulty external imaging/radar subsystem and may provide a displayed and/or audible alert via a display and/or speaker of the vehicle (e.g., via the display unit 215 of FIG. 2) indicating the fault has occurred and/or that the external imaging/radar subsystem may not be usable.

Figure 7:
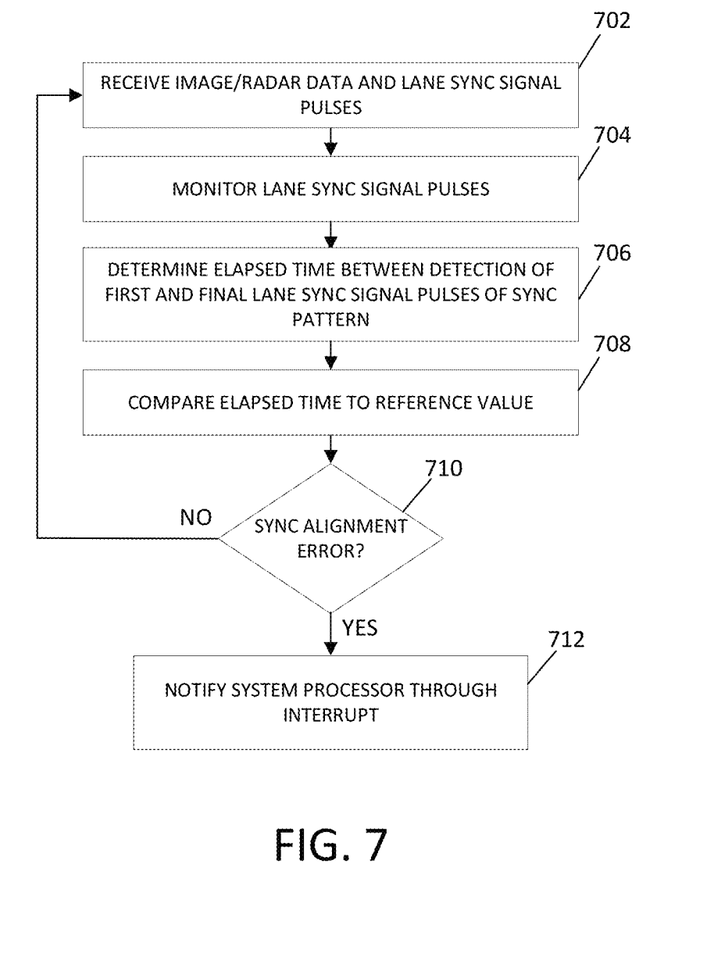
FIG. 7 is a flow chart for a method of identifying synchronization alignment errors during MIPI CSI-2 data reception, in accordance with example embodiments.

FIG. 7 shows an illustrative method for detection of a sync alignment error during reception of image/radar data according to the MIPI CSI-2 protocol, and for generation of an interrupt in response to the sync alignment error. For example, the method may be performed, at least in part, by sync monitoring circuitry (e.g., sync monitoring circuitry 333 of FIG. 3), a MIPI CSI-2 controller (e.g., MIPI CSI-2 controller 400 of FIG. 4) and/or an interrupt controller (e.g., interrupt controller 342 of FIG. 3) of a camera/radar system (e.g., camera/radar system 105, 205, 305, FIGS. 1, 3, 5) executing computer-readable instructions stored in a memory of the camera/radar system.

At step 702, image/radar data and lane sync signal pulses are received by the MIPI CSI-2 controller. For example, the image/radar data may be sent by one or more imaging/radar subsystems (e.g., imaging/radar subsystems 150, 250, 350 FIGS. 1, 2, 3) over one or more data lanes coupled to the MIPI-CSI-2 controller (e.g., data lanes 408 of FIG. 4). For example, the lane sync signal pulses may be received by a lane merging FSM (e.g., lane merging FSM 410 of FIG. 4) of the MIPI CSI-2 controller via one or more synchronization inputs (e.g., synchronization inputs 408 of FIG. 4).

At step 704, the sync monitoring circuitry monitors the synchronization inputs. For example, the sync monitoring circuitry may sense any lane synchronization signal pulses occurring on the synchronization inputs. For example, the sync monitoring circuitry may determine a first time at which a first lane sync signal pulse is received via the synchronization inputs, and the sync monitoring circuitry may determine a second time at which a final lane sync signal pulse (e.g., corresponding to a final lane sync signal pulse of a predefined sync pattern).

At step 706, the sync monitoring circuitry may determine the elapsed time between the receipt of the first lane sync signal pulse and the receipt of the final lane sync signal pulse of the sync pattern. For example, the elapsed time may be equal to the difference between the final time and the first time.

At step 708, the sync monitoring circuitry compares the elapsed time to a reference value. For example, the reference value may be a predetermined scan window length.

At step 710, the sync monitoring circuitry determines whether a sync alignment error has occurred based on the comparison between the elapsed time and the reference value. For example, if the elapsed time exceeds the reference value, the sync monitoring circuitry may determine that a sync alignment error has occurred. If so, the method may proceed to step 712. If no sync alignment error is detected, the method may return to step 702.

At step 712, in response to detection of a sync alignment error, the sync monitoring circuitry may cause the interrupt processor to generate an interrupt (e.g., by asserting a corresponding flag in the system memory) notifying a system processor of the occurrence of the sync alignment error. The sync alignment error generally indicates that an error has occurred either in a sensor of the external imaging/radar subsystem associated with the sync alignment error, or in a link connecting the system to that subsystem. The system processor may reset the system in response to the sync alignment error. If the sync alignment error persists after reset, the system processor may provide an indication of a permanent fault of the link and/or sensor associated with the sync alignment error.

As mentioned previously, the MIPI CSI-2 standard (e.g., as implemented by the MIPI CSI-2 receiver subsystem 330 of FIG. 3) defines start and end frame boundaries for each frame of image/radar data (e.g., using the timing event generator 340 of FIG. 3). Such frame boundaries may exist for all frames on each of a number of supported virtual channels (VCs). Errors might occur over the link between the MIPI CSI-2 subsystem and corresponding imaging/radar subsystems (e.g., imaging/radar subsystems 350 of FIG. 3) so as to cause one or more frame start or end boundaries to become corrupted. Such errors may cause packets to be dropped, resulting in data loss, due to timing events not being recognized by the processor (e.g., the vision/radar processor 310 of FIG. 3) handling the image/radar data. When such timing event corruption occurs, conventional receiver systems may merely be capable of indicating a generic error and, in response, stalling further image/radar data reception and potentially resetting/reinitializing the entire link between the imaging/radar subsystems and the conventional receiver.

In contrast, embodiments of the present system may be capable of both identifying and recovering from timing event boundary corruption errors. For example, the occurrence of a timing event boundary corruption error may be identified and reported by a timing event generator of the system, and the system may correct the error so that data reception operations may continue uninterrupted. For example, the timing event generator of the system may generate relevant triggers even in the scenario of loss of a timing event (e.g., frame start/end boundary) in an image/radar data frame. This allows the system to recover from the lost timing event without requiring the full reset/reconfiguration of the link between the system and the imaging/radar subsystems, and normal operation may subsequently resume.

Figure 8:
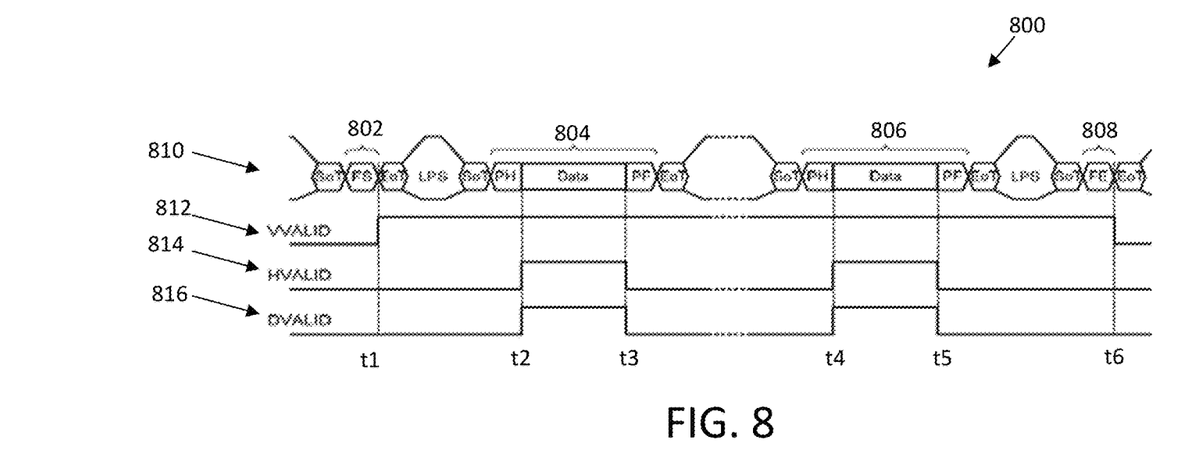
FIG. 8 is a timing diagram depicting a "normal" frame transmission having appropriately placed frame start and frame end boundaries, in accordance with example embodiments.

FIG. 8 shows a timing diagram 800 corresponding to a standard "normal" data stream 810 and associated signals 812, 814, and 816 that may be received by a vision/radar processor (e.g., vision/radar processor 110, 210, 310, FIGS. 1, 2, 3) from a MIPI CSI-2 receiver subsystem (e.g., MIPI CSI-2 receiver subsystem 130, 230, 330, FIGS. 1, 2, 3) of a camera/radar system (e.g., camera/radar system 105, 205, 305, FIGS. 1, 2, 3) during reception of image/radar data.

The data stream 810 may include a sequence of timing events and data packets (shown here as sequential, labeled blocks). Here, as well as in FIGS. 9 and 10, "SoT" represents a Start of Transmission identifier, "FS" represents a frame start boundary, "EoT represents an End of Transmission identifier, "LPS" represents a low power state (e.g., occurring between EoT and SoT identifiers), "PH" represents a packet header of a data packet, "Data" represents data contained within a data packet, "PF" represents a packet footer of a data packet, and "FE" represents a frame end boundary.

A VVALID signal 812 is set to a "high" logic state in response to a frame start boundary, and remains high until a frame end boundary is received. During normal operation, the VVALID signal 812 remains high, uninterrupted, throughout the transmission of a single frame of image/radar data.

An HVALID signal 814 is set to a "high" logic state in response to a packet header, and remains high until a packet footer is received. During normal operation the HVALID signal 814 remains high, uninterrupted, throughout the transmission of data of a single data packet.

A DVALID signal 816 is set to a "high" logic state when data received via the data stream 810 is valid. For example, multiple pulses of DVALID may occur during to occurrence of a single HVALID pulse, in some instances.

For example, at time t1, in response to the frame start boundary 802, the VVALID signal 812 is set high. At time t2, in response to the packet header of the data packet 804, which corresponds to the first packet of the data frame, the HVALID and DVALID signals 814 and 816 are set high. At time t3, the HVALID and DVALID signals 814 and 816 are set low at the transition between the data of the data packet 804 and the packet footer of the data packet 804. Similarly, the HVALID and DVALID signals 814 and 816 are set high between times t4 and t5 during transmission of the data of the data packet 806, which corresponds to the last packet of the data frame. At time t6, the VVALID signal 812 is set low in response to the frame end boundary 808, indicating to the vision/radar processor that the frame has ended.

Figure 9:
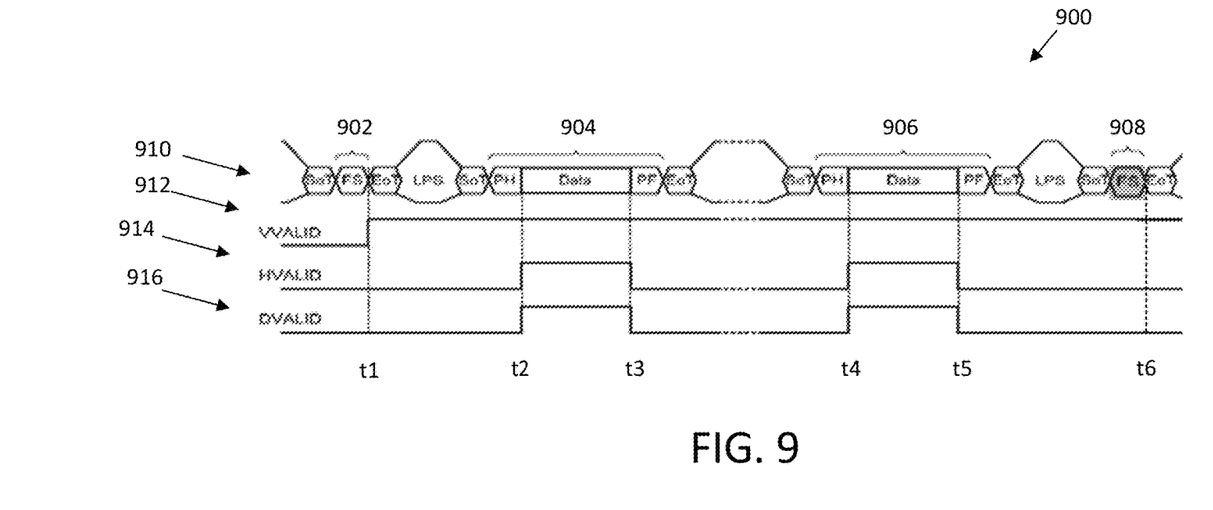
FIG. 9 is a timing diagram depicting an erroneous frame transmission having two consecutive frame start boundaries without an intervening frame end boundary, without erroneous frame recovery.

FIG. 9 shows a timing diagram 900 corresponding to an erroneous data stream 910 (e.g., that contains a timing event error) and associated signals 912, 914, and 916 that may be received by a vision/radar processor from a MIPI CSI-2 receiver subsystem of a camera/radar system during reception of image/radar data. The present example corresponds to a conventional camera/radar system that is not capable of identifying or recovering from timing event errors.

The VVALID, HVALID, and DVALID signals 912, 914, and 916, respectively, may correspond in function to the VVALID, HVALID, and DVALID signals 812, 814, and 816 of FIG. 8, and are not described again here for the sake of brevity.

In the present example, the VVALID signal 912 is set high at time t1 in response to the frame start boundary 902. The HVALID and DVALID signals 914 and 916 are high between times t2 to t3 and times t4 to t5, corresponding to the data of data packets 904 and 906, respectively. At time t6, a timing event error occurs in the form of a second consecutive frame start boundary 908, where a frame end boundary should have been present. Because of this unexpected, erroneous frame start boundary 908, the VVALID signal is not set low at time t6, and subsequent data packets will continue to be interpreted as corresponding to the data frame initiated at time t1. In order to recover from this error, the conventional system will have to reset the link to the imaging/radar subsystems from which it is receiving data, resulting in undesirable interruptions to system operation.

Figure 10:
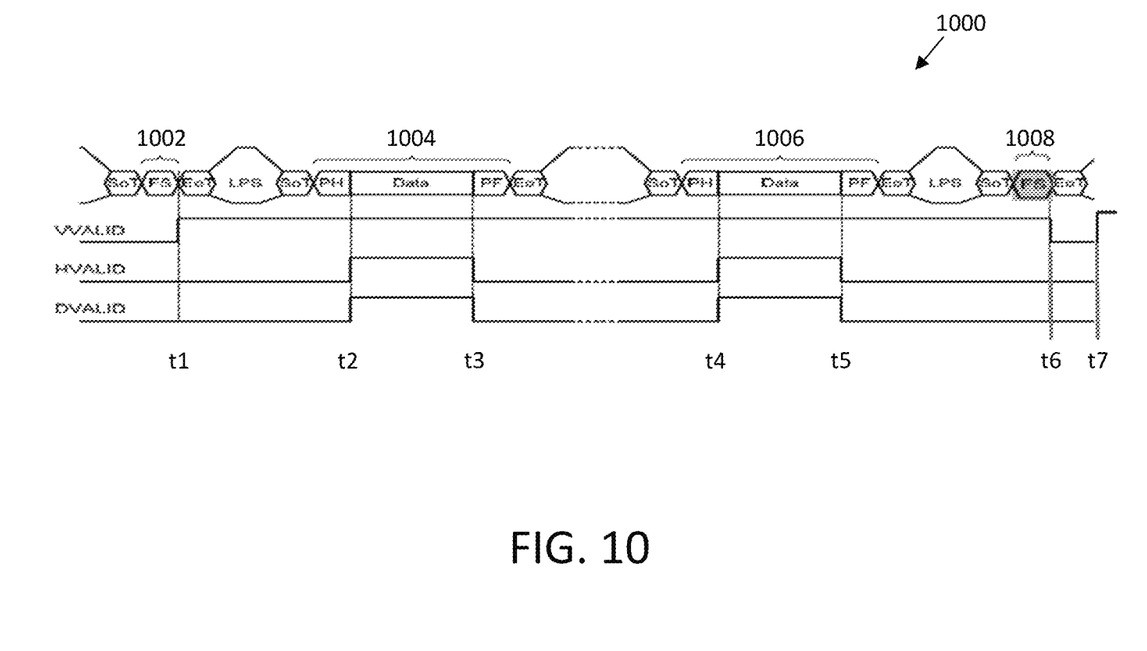
FIG. 10 is a timing diagram depicting an erroneous frame transmission having two consecutive frame start boundaries without an intervening frame end boundary, where the erroneous frame is recovered after the occurrence of the second consecutive frame start; in accordance with example embodiments.

FIG. 10 shows a timing diagram 1000 corresponding to an erroneous data stream 1010 and associated signals 812, 814, and 816 that may be received by a vision/radar processor (e.g., vision/radar processor 110, 210, 310, FIGS. 1, 2, 3) from a MIPI CSI-2 receiver subsystem (e.g., MIPI CSI-2 receiver subsystem 130, 230, 330, FIGS. 1, 2, 3) of a camera/radar system (e.g., camera/radar system 105, 205, 305, FIGS. 1, 2, 3) during reception of image/radar data. The system of the present example is capable of recovering from timing event errors.

The VVALID, HVALID, and DVALID signals 1012, 1014, and 1016, respectively, may correspond in function to the VVALID, HVALID, and DVALID signals 812, 814, and 816 of FIG. 8, and are not described again here for the sake of brevity.

In the present example, the VVALID signal 1012 is set high at time t1 in response to the frame start boundary 1002. The HVALID and DVALID signals 1014 and 1016 are high between times t2 to t3 and times t4 to t5, corresponding to the data of data packets 1004 and 1006, respectively. At time t6, a timing event error occurs in the form of a second consecutive frame start boundary 1008, where a frame end boundary should have been present. The camera/radar system identifies the timing event error associated with the unexpected frame start boundary 1008, and the VVALID signal 1012 is still set low at time t6. Then, at time t7 following an end of transmission identifier, the VVALID signal 1012 is set high again (e.g., to account for the possibility that the missing frame end boundary was dropped entirely, not just erroneously changed to a frame start boundary). Thus, subsequent data packets will be interpreted as corresponding to a new data frame initiated at time t7. In this way, reception and processing of the data stream 1002 may continue uninterrupted despite the timing event error.

Figure 11:
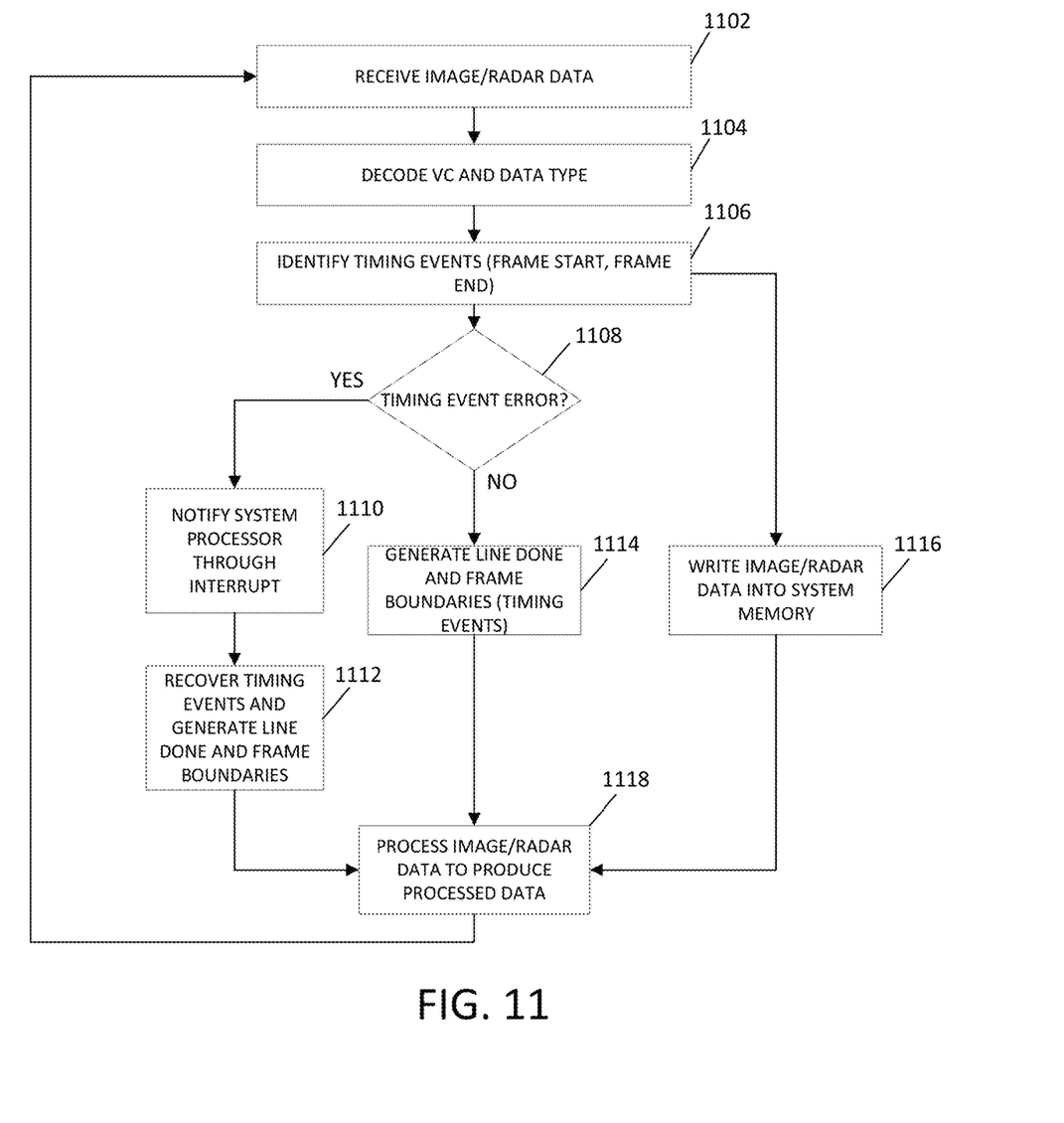
FIG. 11 is a flow chart for a method of performing timing event recovery of a MIPI CSI-2 data stream, in accordance with example embodiments.

FIG. 11 shows an illustrative method for detection of a timing event error during reception of image/radar data according to the MIPI CSI-2 protocol, and for correction of the timing event error. For example, the method may be performed, at least in part, by a timing event generator (e.g., timing event generator 340 of FIG. 3) and a VC and data type decoder (e.g., VC and data type decoder 338 of FIG. 3) of a MIPI CSI-2 subsystem (e.g., MIPI CSI-2 subsystem 130, 230, 330, FIGS. 1, 2, 3) of a camera/radar system (e.g., camera/radar system 105, 205, 305, FIGS. 1, 3, 5) executing computer-readable instructions stored in a memory of the camera/radar system.

At step 1102, the MIPI CSI-2 subsystem receives image/radar data from one or more imaging/radar subsystems (e.g., imaging/radar subsystems 150, 250, 350, FIGS. 1, 2, 3).

At step 1104, a VC and data type decoder of the MIPI CSI-2 subsystem (e.g., VC and data type decoder 338 of FIG. 3) decodes the virtual channel and data type of the received image/radar data.

At step 1106, the timing event generator identifies timing events (e.g., frame start, frame end, etc.) embedded in the received image/radar data, including frame start boundaries and frame end boundaries At step 1108, the timing event generator determines whether a timing event error has occurred. For example, the timing event generator may identify the presence of two consecutive frame start boundaries (i.e., consecutive in that they are not separated by a frame end boundary) or two consecutive frame end boundaries (i.e., consecutive in that they are not separated by a frame start boundary) as corresponding to a timing event error. If a timing event error is detected and identified, the method proceeds to step 1110. Otherwise, if no timing event error is detected, the method proceeds to step 1114.

At step 1110, the MIPI CSI-2 subsystem causes an interrupt processor (e.g., interrupt processor 342 of FIG. 3) to notify a system processor of the camera/radar system (e.g., via generation of an interrupt) that a timing event error has occurred.

At step 1112, the timing event generator recovers the timing events that were lost or corrupted as a result of the timing event error. For example, the timing event generator may control a VVALID signal sent to a vision/radar processor (e.g., vision/radar processor 310 of FIG. 3) to simulate the occurrence of a missing frame end boundary or frame start boundary, depending on the identified type of timing event error that has occurred, in order to effectively recover the timing event. The timing event generator may also generate line done and frame boundaries at this step as part of the error recovery.

At step 1114, the timing event generator generates line done and frame boundaries (e.g., corresponding to timing events).

At step 1116, which is performed in parallel with the steps 1108, 1110 and 1112, or the steps 1108 and 1114, depending on whether a timing event error has occurred, the MIPI CSI-2 subsystem (e.g., via a MIPI CSI-2 controller thereof, such as the MIPI CSI-2 controller 400 of FIG. 4) writes the image/radar data into system memory.

At step 1118, the vision radar processor of the system may retrieve image/radar data from the system memory according to timing events received from the timing event generator, and may process the image/radar data using feature extraction and/or statistical methods (e.g., to identify objects that are near, in the path of, or otherwise around the vehicle associated with the system). The method may then return to step 1102 and may repeat as new image/radar data continues to be received from the imaging/radar subsystems.

While at least one exemplary embodiment has been presented in the foregoing detailed description, it should be appreciated that a vast number of variations exist.

In an example embodiment, a camera system may include a receiver subsystem that receives image data from at least one imaging subsystem via a plurality of data lanes, a vision processor configured to receive a vertical sync signal and a data stream from the receiver subsystem, the data stream including the image data, and a memory device configured to store computer-readable instructions, where the computer-readable instructions, when executed by the receiver subsystem, cause the receiver subsystem to identify a timing event error in the data stream, cause an interrupt to be generated, the interrupt corresponding to the identified timing event error, and control the vertical sync signal to correct the timing event error.

In some embodiments, the receiver subsystem may be configured to process mobile industry processor interface, MIPI, alliance camera serial interface, CSI-2 image data.

In some embodiments, the receiver subsystem may include a timing event generator configured to generate timing events for the data stream, where the timing event generator controls the vertical sync signal to correct the timing event error.

In some embodiments, the computer-readable instructions, when executed by the receiver subsystem, may cause the receiver subsystem to identify the timing event error in the data stream by identifying two consecutive frame start boundaries in the data stream that are uninterrupted by any frame end boundary.

In some embodiments, the computer-readable instructions, when executed by the receiver subsystem, may cause the receiver subsystem to set the vertical sync signal high in response to a first frame start boundary of the two consecutive frame start boundaries, and control the vertical sync signal to correct the timing event error by setting the vertical sync signal low in response to a second frame start boundary of the two consecutive frame start boundaries.

In some embodiments, the receiver subsystem may receive synchronization signal pulses via multiple synchronization inputs, and the computer-readable instructions, when executed by the receiver subsystem, may cause the receiver subsystem to monitor the plurality of synchronization inputs, detect a sync alignment error based on a synchronization pattern of the synchronization signal pulses received via the plurality of synchronization inputs, and generate a second interrupt in response to the sync alignment error.

In some embodiments, the receiver subsystem may include synchronization monitoring circuitry configured to detect the sync alignment error, where the camera system includes an interrupt controller configured to output the interrupt and the second interrupt to a system processor coupled to the receiver subsystem.

In some embodiments, the computer-readable instructions, when executed by the receiver subsystem, may cause the receiver subsystem to: detect the sync alignment error by determining that one or more synchronization signal pulses of the synchronization pattern occur outside of a scan window having a predefined length.

In an example embodiment, a method for processing video data in a camera system that includes a host processor may include steps of receiving, by a receiver subsystem of the camera system, image data from at least one imaging subsystem via a plurality of data lanes, generating, by the receiver subsystem, a vertical sync signal and a data stream based on the image data, receiving, by a vision processor of the camera system from the receiver subsystem, the vertical sync signal and the data stream, identifying, by the receiver subsystem, a timing event error in the data stream, sending, by an interrupt controller of the camera system, an interrupt corresponding to the identified timing event error to a system processor of the camera system, and controlling, by the receiver subsystem, the vertical sync signal to correct the timing event error.

In some embodiments, the method may further include the step of generating, by a timing event generator of the receiver subsystem, timing events for the data stream, where controlling the vertical sync signal is performed by the timing event generator.

In some embodiments, identifying the timing event error may include the step of of: identifying, by the timing event generator, two consecutive frame start boundaries in the data stream that are uninterrupted by any frame end boundary.

In some embodiments, the method may further include the step of setting, by the timing event generator, the vertical sync signal to a high logic state in response to a first frame start boundary of the two consecutive frame start boundaries, where controlling the vertical sync signal to correct the timing event error includes the step of setting the vertical sync signal to a low logic state in response to a second frame start boundary of the two consecutive frame start boundaries.

In some embodiments, the method may further include steps of receiving, by the receiver subsystem, synchronization pulses via a plurality of synchronization inputs, detecting a sync alignment error based on a synchronization pattern of the synchronization signal pulses, and sending, by the interrupt controller, a second interrupt corresponding to the sync alignment error to a system processor of the camera system.

In some embodiments, detecting the sync alignment error may include the step of detecting, by sync monitoring circuitry of the receiver subsystem, that at least one synchronization signal pulse of the synchronization signal pulses of the synchronization pattern occur outside of a scan window having a predefined length.

In some embodiments, the receiver subsystem is configured to process mobile industry processor interface, MIPI, alliance camera serial interface, CSI-2, image data.

In an example embodiment, a vehicle may include a camera system that includes a vision processor configured to process image data, a receiver subsystem coupled to the vision processor, the receiver subsystem including a controller including a plurality of buffers coupled to a plurality of imaging subsystems, the plurality of buffers being configured to receive and store image data from the plurality of imaging subsystems via a plurality of data lanes, a finite state machine that receives synchronization signal pulses via a plurality of synchronization inputs, and a lane merging demultiplexer coupled to the finite state machine and to the plurality of buffers, the lane merging demultiplexer being configured to organize the image data stored on the plurality of buffers to produce image data packets. The vehicle may also include a timing event generator configured to generate timing events for the image data packets, and to output a data stream including the image data packets and a vertical sync signal to the vision processor, where the timing event generator is configured to identify and correct timing event errors in the data stream by controlling the vertical sync signal. The vehicle may also include synchronization monitoring circuitry coupled to the controller, the synchronization monitoring circuitry configured to monitor the synchronization signal pulses at the plurality of synchronization inputs, and to identify synchronization errors based on the synchronization signals. The vehicle may also include an interrupt controller configured to output interrupts in response to the identified synchronization errors and the identified timing event errors. The vehicle may also include a system processor configured to receive the interrupts form the interrupt controller, and to take action in response to at least one of the interrupts.

In some embodiments, the receiver subsystem may be configured to process mobile industry processor interface, MIPI, alliance camera serial interface, CSI-2, image data.

In some embodiments, a synchronization error of the identified synchronization errors may correspond to a synchronization pattern including at least a portion of the synchronization signal pulses, where at least one synchronization signal pulse of the synchronization pattern occurs outside of a scan window having a predetermined length.

In some embodiments, a timing event error of the timing event errors may correspond to two consecutive frame start boundaries in the data stream that are uninterrupted by any frame end boundary.

In some embodiments, to correct the timing event error, the timing event generator may be configured to set the vertical sync signal to a high logic state in response to a first frame start boundary of the two consecutive frame start boundaries, and to set the vertical sync signal to a low logic state in response to a second frame start boundary of the two consecutive frame start boundaries.

It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A camera system comprising:
   a receiver subsystem that receives image data from at least one imaging subsystem via a plurality of data lanes;
   a vision processor configured to receive a vertical sync signal and a data stream from the receiver subsystem, the data stream comprising the image data; and
   a memory device configured to store computer-readable instructions, wherein the computer-readable instructions, when executed by the receiver subsystem, cause the receiver subsystem to:
      identify a timing event error in the data stream;
      cause an interrupt to be generated, the interrupt corresponding to the identified timing event error; and
      control the vertical sync signal to correct the timing event error;
      identify the timing event error in the data stream by identifying two consecutive frame start boundaries in the data stream that are uninterrupted by any frame end boundary;
      set the vertical sync signal high in response to a first frame start boundary of the two consecutive frame start boundaries; and
      control the vertical sync signal to correct the timing event error by setting the vertical sync signal low in response to a second frame start boundary of the two consecutive frame start boundaries.

2. The camera system of claim 1, wherein receiver subsystem is configured to process Mobile Industry Processor Interface, MIPI, Alliance Camera Serial Interface, CSI-2, image data.

3. The camera system of claim 1, wherein the receiver subsystem comprises:
   a timing event generator configured to generate timing events for the data stream, wherein the timing event generator controls the vertical sync signal to correct the timing event error.

4. The camera system of claim 1, wherein the receiver subsystem receives synchronization signal pulses via a plurality of synchronization inputs, and wherein the computer-readable instructions, when executed by the receiver subsystem, cause the receiver subsystem to:
monitor the plurality of synchronization inputs;
detect a sync alignment error based on a synchronization pattern of the synchronization signal pulses received via the plurality of synchronization inputs; and
generate a second interrupt in response to the sync alignment error.

5. The camera system of claim 4, wherein the receiver subsystem comprises synchronization monitoring circuitry configured to detect the sync alignment error, wherein the camera system comprises an interrupt controller configured to output the interrupt and the second interrupt to a system processor coupled to the receiver subsystem.

6. The camera system of claim 5, wherein the computer-readable instructions, when executed by the receiver subsystem, cause the receiver subsystem to:
detect the sync alignment error by determining that one or more synchronization signal pulses of the synchronization pattern occur outside of a scan window having a predefined length.

7. A method for processing video data in a camera system that includes a host processor, the method comprising:
receiving, by a receiver subsystem of the camera system, image data from at least one imaging subsystem via a plurality of data lanes;
generating, by the receiver subsystem, a vertical sync signal and a data stream based on the image data;
receiving, by a vision processor of the camera system from the receiver subsystem, the vertical sync signal and the data stream;
identifying, by the receiver subsystem, a timing event error in the data stream;
sending, by an interrupt controller of the camera system, an interrupt corresponding to the identified timing event error to a system processor of the camera system;
controlling, by the receiver subsystem, the vertical sync signal to correct the timing event error;
identifying, by the timing event generator, two consecutive frame start boundaries in the data stream that are uninterrupted by any frame end boundary; and
setting, by the timing event generator, the vertical sync signal to a high logic state in response to a first frame start boundary of the two consecutive frame start boundaries, wherein controlling the vertical sync signal to correct the timing event error comprises:
setting the vertical sync signal to a low logic state in response to a second frame start boundary of the two consecutive frame start boundaries.

8. The method of claim 7, further comprising:
generating, by a timing event generator of the receiver subsystem, timing events for the data stream, wherein controlling the vertical sync signal is performed by the timing event generator.

9. The method of claim 7, further comprising:
receiving, by the receiver subsystem, synchronization pulses via a plurality of synchronization inputs;
detecting a sync alignment error based on a synchronization pattern of the synchronization signal pulses; and
sending, by the interrupt controller, a second interrupt corresponding to the sync alignment error to a system processor of the camera system.

10. The method of claim 9, wherein detecting the sync alignment error comprises:
detecting, by sync monitoring circuitry of the receiver subsystem, that at least one synchronization signal pulse of the synchronization signal pulses of the synchronization pattern occur outside of a scan window having a predefined length.

11. The method of claim 7, wherein the receiver subsystem is configured to process Mobile Industry Processor Interface, MIPI, Alliance Camera Serial Interface, CSI-2, image data.

12. A vehicle comprising a camera system that comprises:
a vision processor configured to process image data;
a receiver subsystem coupled to the vision processor, the receiver subsystem comprising:
a controller comprising:
a plurality of buffers coupled to a plurality of imaging subsystems, the plurality of buffers being configured to receive and store image data from the plurality of imaging subsystems via a plurality of data lanes;
a finite state machine that receives synchronization signal pulses via a plurality of synchronization inputs; and
a lane merging demultiplexer coupled to the finite state machine and to the plurality of buffers, the lane merging demultiplexer being configured to organize the image data stored on the plurality of buffers to produce image data packets;
a timing event generator configured to generate timing events for the image data packets, and to output a data stream comprising the image data packets and a vertical sync signal to the vision processor, wherein the timing event generator is configured to identify and correct timing event errors in the data stream by controlling the vertical sync signal; and
synchronization monitoring circuitry coupled to the controller, the synchronization monitoring circuitry configured to monitor the synchronization signal pulses at the plurality of synchronization inputs, and to identify synchronization errors based on the synchronization signals; and
an interrupt controller configured to output interrupts in response to the identified synchronization errors and the identified timing event errors;
a system processor configured to receive the interrupts form the interrupt controller, and to take action in response to at least one of the interrupts,
wherein a timing event error of the timing event errors corresponds to two consecutive frame start boundaries in the data stream that are uninterrupted by any frame end boundary; and
to correct the timing event error, the timing event generator is configured to set the vertical sync signal to a high logic state in response to a first frame start boundary of the two consecutive frame start boundaries, and to set the vertical sync signal to a low logic state in response to a second frame start boundary of the two consecutive frame start boundaries.

13. The vehicle of claim 12, wherein receiver subsystem is configured to process Mobile Industry Processor Interface, MIPI, Alliance Camera Serial Interface, CSI-2, image data.

14. The vehicle of claim 12, wherein a synchronization error of the identified synchronization errors corresponds to a synchronization pattern comprising at least a portion of the synchronization signal pulses, wherein at least one synchronization signal pulse of the synchronization pattern occurs outside of a scan window having a predetermined length.

* * * * *